United States Patent [19]

Walther

[11] Patent Number: 4,843,413

[45] Date of Patent: Jun. 27, 1989

[54] SYSTEM WHICH USES THRESHOLD COUNTS TO ACHIEVE AUTOMATIC FOCUS

[75] Inventor: Lawrence E. Walther, Macedon, N.Y.

[73] Assignee: Eastman Kodak Company, Rochester, N.Y.

[21] Appl. No.: 174,302

[22] Filed: Jun. 28, 1988

[51] Int. Cl.$^4$ .............................................. G03B 3/00
[52] U.S. Cl. ................................... 354/402; 250/201
[58] Field of Search ................ 354/402; 250/201 PF; 358/227

[56] References Cited

U.S. PATENT DOCUMENTS

| | | | |
|---|---|---|---|
| 3,274,913 | 9/1966 | Biedermann et al. | 95/44 |
| 3,713,371 | 1/1973 | Makoto et al. | 354/402 |
| 3,896,304 | 7/1975 | Aoki et al. | 250/201 |
| 3,918,071 | 11/1975 | Albrecht | 354/25 |
| 4,183,642 | 1/1980 | Fukuoka | 354/25 |
| 4,298,259 | 11/1981 | Aoki et al. | 354/25 |
| 4,320,417 | 3/1982 | Hanma et al. | 358/227 |
| 4,381,523 | 4/1983 | Eguchi et al. | 358/227 |
| 4,382,665 | 5/1983 | Eguchi et al. | 354/25 |
| 4,392,726 | 7/1983 | Kimura | 354/25 |
| 4,445,761 | 5/1984 | Ishikawa et al. | 354/402 |
| 4,458,145 | 7/1984 | Voles | 250/204 |
| 4,470,676 | 9/1984 | Kinoshita et al. | 354/406 |
| 4,500,925 | 2/1985 | Hanma et al. | 358/227 |
| 4,523,231 | 6/1985 | Therrien | 358/139 |
| 4,544,953 | 10/1985 | Goldman | 358/227 |
| 4,563,705 | 1/1986 | Oinoue et al. | 358/227 |
| 4,584,704 | 4/1986 | Ferren | 354/400 |
| 4,591,919 | 5/1986 | Kaneda et al. | 358/227 |
| 4,600,830 | 7/1986 | Tokutomi et al. | 250/201 |
| 4,616,264 | 10/1986 | Pahtissky | 358/227 |
| 4,638,364 | 1/1987 | Hiramatsu | 358/227 |
| 4,660,092 | 4/1987 | Nutting | 358/227 X |
| 4,672,456 | 6/1987 | Murai et al. | 358/227 |
| 4,695,893 | 9/1987 | Makino et al. | 358/227 |
| 4,701,782 | 10/1987 | Duvent | 358/227 |

Primary Examiner—W. B. Perkey
Attorney, Agent, or Firm—Robert H. Sproule

[57] ABSTRACT

Apparatus for generating automatic focus signals for positioning a lens includes a circuit for calculating a difference value between a selected pixel intensity level and the average value of the pixel intensities which neighbor the selected pixel. The difference value is fed to a thresholding circuit which generates a signal for clocking a downstream counter whenever the difference value exceeds a selected threshold value. The lens is repositioned until the output from the counter is a maximum thereby indicating an infocus position of the lens.

7 Claims, 2 Drawing Sheets

SYSTEM WHICH USES THRESHOLD COUNTS TO ACHIEVE AUTOMATIC FOCUS

TECHNICAL FIELD

The present invention pertains to an automatic focus system which adjusts the focus as a function of the number of times incoming image intensity information exceed a selected threshold.

BACKGROUND OF THE INVENTION

There are numerous methods for automatically focusing a camera. Many of these methods have a common basis in that the high frequency components of the image are detected and accumulated for various focal positions of the lens. By comparing the present value of the accumulated high frequency components with their previous accumulated value, it can be determined at what lens position the high frequency components are at a maximum. This lens position is concluded to be the optimum focal position.

Somewhat related autofocus systems are discussed in U.S. Pat. No. 3,713,371 by Kurihara et al, where there is disclosed an autofocus system which operates as a function of the difference in brightness levels between adjacent elements of an image.

In U.S. Pat. No. 4,392,726 by Kimura there is disclosed an automatic focus control system which determines an optimum focus condition to exist when the high frequency components of the image are at a maximum value.

Furthermore, Fukuoka in U.S. Pat. No. 4,183,642, discloses an autofocus device which involves calculating a difference in brightness information between adjacent picture elements, effecting an operation to provide smoothness of the brightness change associated with this difference, providing an accumulated value of the smoothness of the brightness change with respect to all picture elements, and adjusting the focus to maximize this accumulated value.

And, in U.S. Pat. No. 4,437,743 by Sakai et al there is disclosed a signal processing system for processing signals from accumulating type photoelectric transducer elements wherein a means is incorporated for varying a threshold level of an input signal.

Due to the presence of noise, however, the method of adjusting the lens position until the high frequency components are maximized sometimes results in less than optimum focus. That is, the presence of high frequency noise can result in a maximum signal when the lens is still out of focus. It is therefore desirable to provide an autofocus system which displays some immunity to noise to generate a control signal for accurately achieving autofocus.

In addition, where the high frequency components of the video signal are accumulated to detect a maximum, the hardware necessary to generate this large accumulated value can be substantial. It is desirable therefore to reduce the hardware requirement while still generating accurate autofocus information.

SUMMARY OF THE INVENTION

In the present invention, there is provided a method for generating automatic focus signals to position a lens. The method includes the steps of receiving pixel information as a function of a position of the lens, and selecting high frequency components of this pixel information. Additional steps include establishing a selected threshold level and selecting those high frequency components which exceed the selected threshold level. Finally, the number of high frequency components which exceed the selected threshold level are counted, and the lens is positioned so that the high frequency component count is a maximum.

BRIEF DESCRIPTION OF THE DRAWINGS

These and other features and advantages of the present invention will become more apparrarent upon reading the following detailed description in conjunction with the attached drawings, in which.

DETAILED DESCRIPTION OF THE INVENTION

By way of introduction, in the present invention only those high frequency image signals which exceed a selected threshold amplitude are considered for autofocus purposes. The number of these threshold-exceeding signals are counted at each position of the lens, and when this count is determined to be a maximum, it is concluded that the lens is at an optimum focus position.

Figure 1:
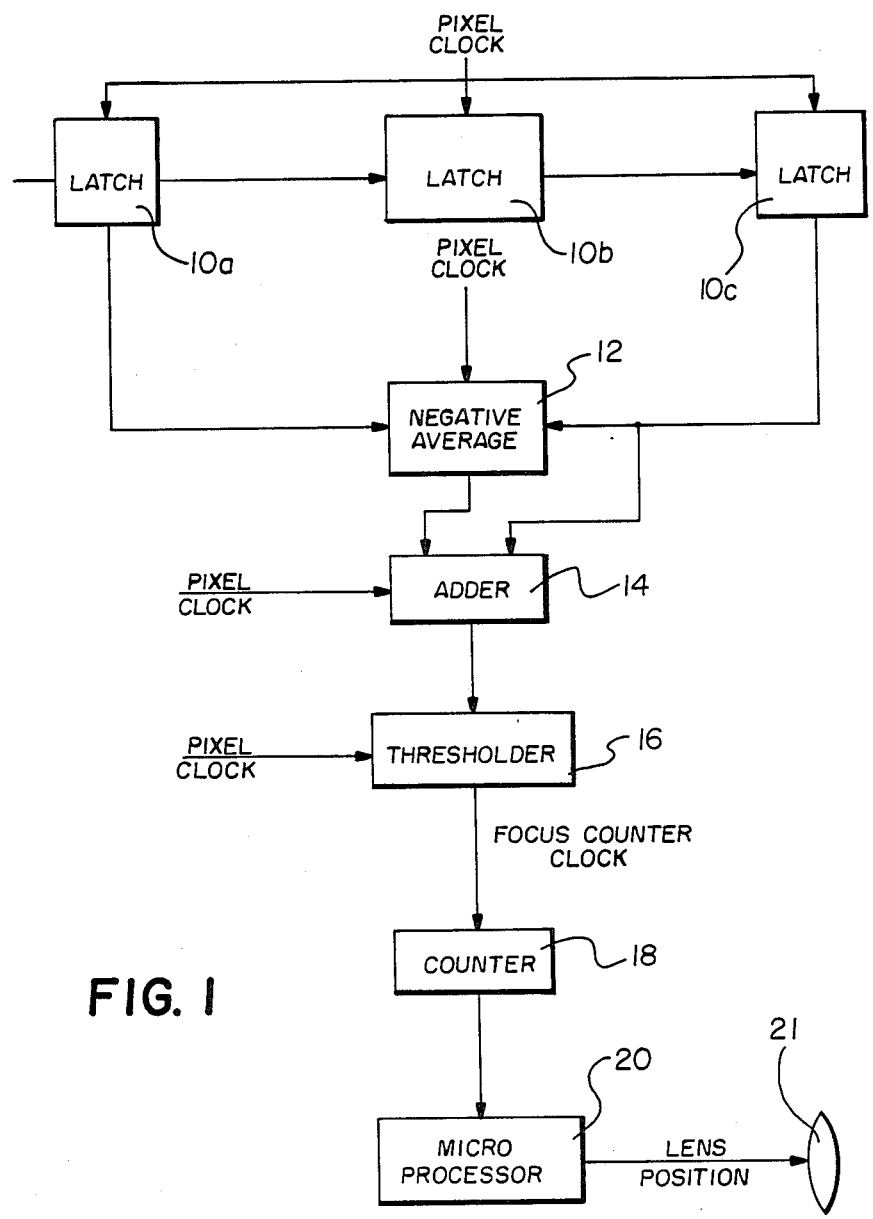
FIG. 1 is a simplified block diagram of the autofocus system of the present invention.

Now to describe the present invention in more detail by referring first to FIG. 1, there are shown three latches 10a, 10b, and 10c, which receive a continuous stream of digitized pixel data from an upstream video sensor system (not shown), and which is clocked out of the sensor system by a conventional pixel clock signal. An exemplary sensor system is described in U.S. Pat. No. 4,663,661 by Weldy et al, which is assigned to the assignee of the present invention. In a further exemplary embodiment, the sensor output is utilized to generate a video display.

In the present invention, the pixel intensity data (in gray scale from 0 through 255) is clocked by the pixel clock first into latch 10a, then at the next pixel clock pulse into latch 10b; and then into latch 10c on the next pixel clock pulse. For convenience of explanation, the pixel in latch 10a will be referred to as the left pixel, while the remaining pixels in latches 10b and 10c will be referred to as the center and right pixels respectively.

In order to detect the high frequency pixels from the upstream sensor system, the one's complement (negative) average of the pixel values from the left and right latches 10a, 10c are calculated in a conventional averaging circuit 12. This occurs over a period of one clock cycle during which the center pixel in latch 10b is simultaneously clocked into the right latch 10c. At the next pixel clock cycle, the negative value from averager 12 and the center pixel from latch 10c are added together by a conventional adder 14. This generates an output from adder 14 which is equal to the difference between the center pixel value and the average of the left and right pixel values. In this manner the presence of high frequency signals is determined. That is, a large calculated difference in the pixel intensity values between the center pixel and the average of the left and right pixels is indicative of a high frequency signal; while little or no calculated difference is indicative of a low frequency signal.

In order to minimize the effects of noise, the difference signal from adder 14 is fed to a thresholding circuit 16. The selected level at the thresholding circuit is based upon the assumption that the majority of noisy signals have low amplitudes. In an exemplary embodiment, the threshold is set at a level of seven in the 0 to 255 scale range. This threshold level assumes that the majority of the image is relatively flat field. Thus, at every pixel clock when the difference signal from adder 14 exceeds the threshold, a signal (focus counter clock) is fed to a conventional downstream counter 18 which is reset at the beginning of each new video field. This reset pulse may be generated in the manner described in a copending application entitled "Video Timing System Which Has Signal Delay Compensation And Which Is Responsive To External Synchronization by A.W. Schrock, filed Jan. 11, 1988, and assigned to the assignee of the present; the contents of which are incorporated herein by reference.

To achieve an autofocus function, at the end of each field the current count of counter 18 is fed to a downstream microprocessor 20 which controls the position of an adjustable lens 21. This is accomplished by storing in a lookup table in the microprocessor memory the total count for each position of the lens. The microprocessor then moves the lens one distance increment, receives the new count, and compares the count associated with the new lens position with the previous count. As long as the count continues to increase, the micrprocessor continues to move the lens in the same direction. However, when the counts begins to decrease, the microprocessor determines that the lens has just passed the optimum focus position, and backs the lens one increment to the optimum focus position.

It should be appreciated that the present invention provides noise immunity in several ways. For one, the threshold level removes much of the lower level noise which can detract from accurate autofocusing. Furthermore, in the present invention the presence of one or more high amplitude noise spikes does not improperly weight the count. For example, in conventional apparatus where the high frequency signals are accumulated, the presence of high amplitude noise can have a significant effect on the accumulated total. However, in the present invention, a signal which exceeds the threshold is equal to only one count, regardless of its amplitude. In this manner, more accurate adjustment of the lens position is achieved.

Figure 2:
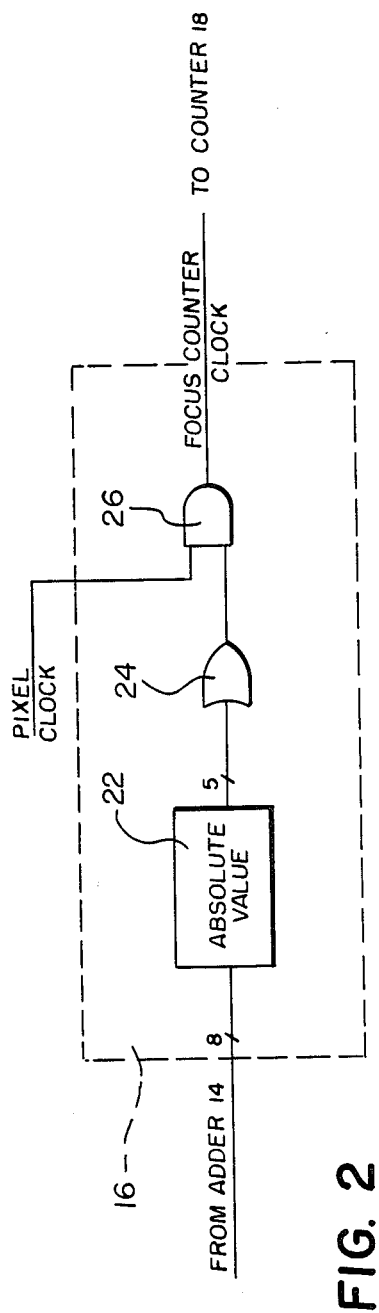
FIG. 2 is a more detailed diagram of a threshold circuit of the autofocus system.

In order to discuss the thresholding circuit 16 in greater detail, reference is made to FIG. 2. In the exemplary embodiment shown in FIG. 2, the eight bit (plus one sign bit) difference output from adder 14, which may be a positive value or a negative value (two's complement), is fed to the input of an absolute value circuit 22. In order to detect when the absolute value of the difference value from adder 14 exceeds seven, the upper five bits generated out of the absolute value circuit are fed to an OR gate 24. As long as the difference value is seven or below, the output from OR gate 24 is low. However when this value exceeds seven, the output from OR gate 24 is high.

Figure 3:
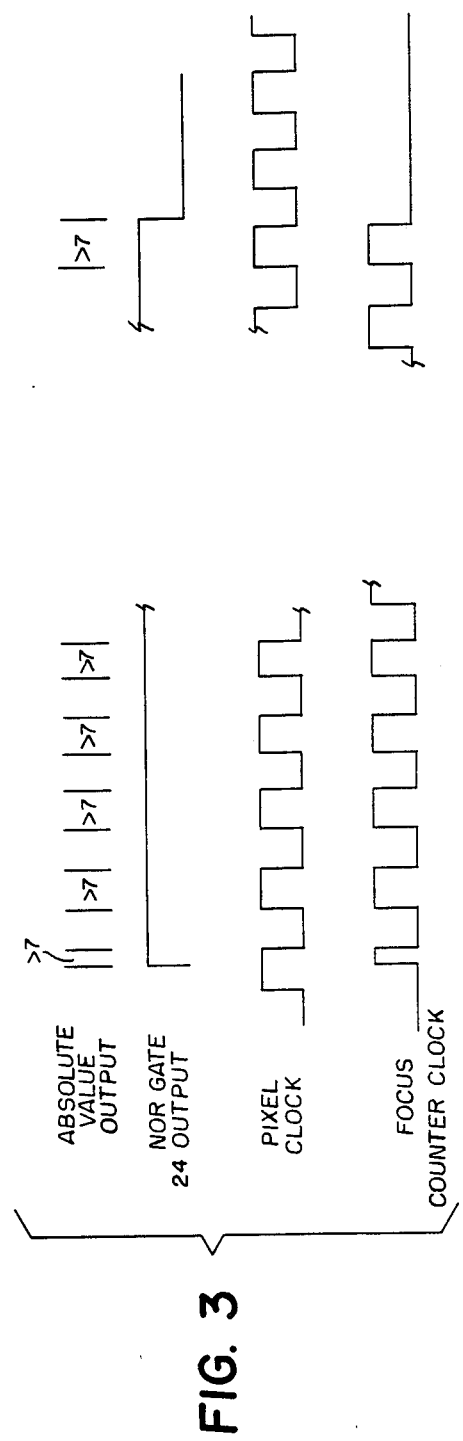
FIG. 3 is a timing diagram showing the generation of a focus counter clock signal.

The output from the OR gate 24 is fed to a downstream AND gate 26 where it is gated by the pixel clock which is fed to the other input of AND gate 26. This is because it is possible for the output from gate 24 to remain high throughout a number of pixel clock cycles as shown in FIG. 3. More specifically, should the difference value remain greater than seven for several pixel clock cycles, only one large pulse will be generated. Therefore in order to generate the proper number of pulses for clocking the counter, a focus counter clock output is generated for each pixel clock in which the absolute difference value exceeds the selected threshold.

What is claimed is:

1. Apparatus for generating automatic focus signals for positioning a lens, the apparatus comprising:
   a. means for receiving image information which is a function of a position of the lens;
   b. means for selecting high frequency components of the image information;
   c. means for establishing a selected threshold level;
   d. means for choosing those high frequency components which exceed the selected threshold level;
   e. means for acquiring a count of high frequency components which exceed the selected threshold level; and
   f. means for positioning the lens so that the high frequency component count is a maximum.

2. The apparatus as set forth in claim 1 wherein the image information comprises picture element information.

3. The apparatus as set forth in claim 2 wherein:
   a. the pixel information is related to intensities of the pixels;
   b. the selecting means includes (1) means for determining a difference in intensity levels between a selected pixel and at least one other pixel, and (2) means for selecting the high frequency pixels as a function of the difference in intensity levels; and
   c. the establishing means includes means for establishing the selected threshold level as a function of a selected difference in the intensity levels.

4. The apparatus as set forth in claim 3 wherein:
   a. the receiving means includes means for storing the intensity levels of the selected pixel and a pixel which neighbors the selected pixel; and
   b. the difference determining means includes means for subtracting the intensity level of the neighboring pixel from the intensity level of the selected pixel.

5. A method for generating automatic focus signals to position a lens, the method comprising the steps of:
   a. receiving pixel information which is a function of a position of the lens;
   b. selecting high frequency components of the pixel information;
   c. establishing a selected threshold level;
   d. choosing those high frequency components which exceed the selected threshold level;
   e. counting the number of high frequency components which exceed the selected threshold level; and
   f. positioning the lens so that the high frequency component count is a maximum.

6. The method as set forth in claim 5 wherein:
   a. the pixel information is related to intensities of the pixels;
   b. the selecting step includes (i) determining a difference in intensity levels between a selected pixel and at least one other pixel, and (ii) selecting the high frequency pixels as a function of the difference in intensity levels; and
   c. the establishing step includes establishing the selected threshold level as a function of a selected difference in the intensity levels.

7. The apparatus as set forth in claim 6 wherein:
a. the receiving step includes storing the intensity levels of the selected pixel and a pixel which neigbors the selected pixel; and
b. the difference determining step includes subtracting the intensity level of the neighboring pixel from the intensity level of the selected pixel.

* * * * *

UNITED STATES PATENT AND TRADEMARK OFFICE
CERTIFICATE OF CORRECTION

PATENT NO. : 4,843,413
DATED : June 27, 1989
INVENTOR(S) : Lawrence E. Walther

It is certified that error appears in the above-identified patent and that said Letters Patent is hereby corrected as shown below:

In the Heading:

Filed: "Jun. 28, 1988" should read --March 28, 1988--

Signed and Sealed this

Twenty-ninth Day of May, 1990

Attest:

HARRY F. MANBECK, JR.

*Attesting Officer*      *Commissioner of Patents and Trademarks*